United States Patent

Liu

[11] Patent Number: 5,985,148
[45] Date of Patent: Nov. 16, 1999

[54] WATER TREATMENT FILTER WOOL BALLS

[76] Inventor: Kai Yuan Liu, P.O. Box 82-144, Taipei, Taiwan

[21] Appl. No.: 08/989,642

[22] Filed: Dec. 12, 1997

[51] Int. Cl.$^6$ ........................................ C02F 3/30
[52] U.S. Cl. ......................... 210/605; 210/617; 210/150
[58] Field of Search .................................. 210/150, 151, 210/169, 615, 616, 617, 605

[56] References Cited

U.S. PATENT DOCUMENTS

| | | | |
|---|---|---|---|
| 4,086,161 | 4/1978 | Burton | 210/150 |
| 4,165,281 | 8/1979 | Kuriyama et al. | 210/150 |
| 4,391,703 | 7/1983 | Crosby | 210/151 |
| 4,422,930 | 12/1983 | Hatanaka | 210/150 |
| 4,582,600 | 4/1986 | Atkinson et al. | 210/151 |
| 4,717,519 | 1/1988 | Sagami | 210/150 |
| 4,758,453 | 7/1988 | Challet et al. | 210/150 |
| 5,108,594 | 4/1992 | Giovanetti et al. | 210/151 |
| 5,160,039 | 11/1992 | Colburn | 210/150 |
| 5,194,231 | 3/1993 | Gough et al. | 210/150 |
| 5,200,081 | 4/1993 | Stuth | 210/151 |
| 5,399,266 | 3/1995 | Hasenawa et al. | 210/150 |

FOREIGN PATENT DOCUMENTS

| | | |
|---|---|---|
| 59-225793 | 12/1984 | Japan . |
| 60-172398 | 9/1985 | Japan . |
| 2-251298 | 10/1990 | Japan . |
| 4-187297 | 7/1992 | Japan . |

*Primary Examiner*—Christopher Upton
*Attorney, Agent, or Firm*—A & J

[57] ABSTRACT

A water treatment filter wool ball includes a plastic ball and wool bundles planted on the surface of the plastic ball. In use, a plurality of plastic balls are put in a filter tank. The wool bundles can culture both anaerobic and aerobic bacteria to decompose toxic substances in the tank. Water can be purified in a very short time.

2 Claims, 1 Drawing Sheet

WATER TREATMENT FILTER WOOL BALLS

BACKGROUND OF THE INVENTION

1. Field of the Invention

The present invention relates generally to a water treatment filter wool ball, and more particularly to a filter material that can culture decomposing bacteria to help decompose toxic substances in the water so as to improve the quality of the water.

2. Description of the Prior Art

In the existing art of treating water in filter tanks, lump-like fiber materials or sheets of sponge or foam material are generally used as filter materials. However, such filter materials are large in size and have poor filtering effects. Besides, they are easily blocked and cannot be cleaned easily. In particular, they have to be made to the size of the filter tank, which is very troublesome.

SUMMARY OF THE INVENTION

The present invention relates generally to a water treatment filter wool ball, and more particularly to a filter material that can culture decomposing bacteria to help decompose toxic substances in the water so as to improve the quality of the water.

Accordingly, a primary object of the present invention is to provide a water treatment filter wool ball to eliminate the drawbacks of the art. According to the present invention, a plastic ball is planted with bundles of wool on its surface to form a biochemical wool ball. In use, the wool balls are put into the water filter tank so that the wool bundles can culture decomposing bacteria to decompose toxic substances in the filter tank and purify the water in a short time.

The foregoing objects and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numberals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

Figure 1:
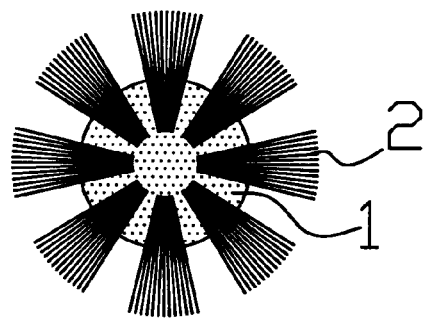
FIG. 1 is a schematic view of the present invention.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

Figure 2:
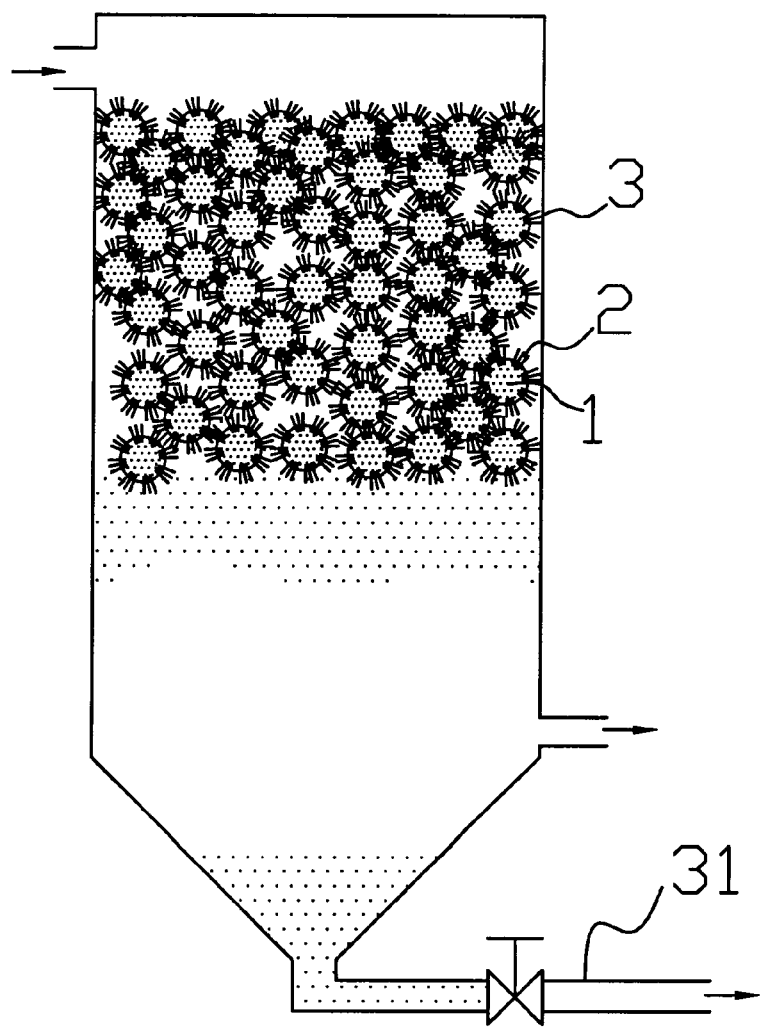
FIG. 2 is a schematic view showing the present invention in use in a water filter tank.

With reference to FIG. 1, the water treatment filter ball essentially comprises a plastic ball 1 and wool bundles 2 planted on the surface of the plastic ball 1, thereby forming a biochemical wool ball. In use, a plurality of wool balls are put in a water filter tank 3 (see FIG. 2). Such wool balls allow smooth passage of water therethrough. Besides, they are not restricted by the size or shape of the filter tank 3. In terms of physical filtration, they have very good effects. In a short time, the dirty water in the tank will become clear. In terms of biological filtration, the effects are even better. The effects are obvious in a very few days. this is because the wool bundles 2 can easily culture decomposing bacteria. The wool bundles 2 planted on the surface of the plastic ball 1 are tightly packed at the base so that anaerobic bacteria can be easily cultured. On the other hand, the front ends of the wool bundles 2 are loosely packed so that aerobic bacteria can be cultured. These two kinds of bacteria can decompose toxic substances such as ammonia, sulfuric acid, etc., which are generate by organic matters in the tank. Thus, water in the tank can be purified.

Due to its exceptional filtering effects in terms of physical and biological filtration, the present invention can be adapted for use in fish ponds, aquariums, water works, waste water treatment plants, biochemical plants, or other relevant plants to treat and filter water.

The wool bundles 2 in the present invention may be wavy strands of wool.

Aside from providing good filtration effects, the present invention makes cleaning of tanks easier. It is only necessary to stir the filter wool balls and discharge the dirty water via a discharge tube 31, or discharge the dirty water and then rinse the tank casually. The tank should not be cleaned very thorough lest that all the decomposing bacteria are washed away and it is necessary to culture new bacteria.

In summary, the present invention provides a filter wool ball comprising of a plastic ball having wool bundles planted thereon to form a biochemical filter ball. The wool bundles can culture both anaerobic and aerobic bacteria to decompose toxic materials in the water tank so as to improve the quality of the water.

I claim:

1. In a biological water treatment filter, the improvement comprising:
   a filter media comprising a plurality of floating plastic wool balls;
   wherein each wool ball comprises a plastic ball with a plurality of wool bundles planted on the surface fo said ball;
   each wool bundle having a tightly packed base end planted on the surface of said ball and a loosely packed free end;
   wherein said tightly packed end forms means to culture anaerobic bacteria and said loosely packed end forms means to culture aerobic bacteria.

2. A method for biologically treating water with aerobic and anaerobic bacteria comprising:
   filtering said water through a filter having a filter media comprising a plurality of floating plastic wool balls, each wool ball comprising a plastic ball with a plurality of wool bundles planted on the surface of said ball;
   each wool bundle having a tightly packed base end planted on the surface of said ball having a culture of anaerobic bacteria and a loosely packed free end having a culture of aerobic bacteria.

* * * * *